United States Patent [19]
Endo et al.
[11] Patent Number: 4,624,547
[45] Date of Patent: Nov. 25, 1986

[54] IMAGE FORMING APPARATUS

[75] Inventors: Makoto Endo, Tokyo; Satoshi Ono, Yokohama; Takao Toda, Tokyo; Kazuo Kashiwagi, Tokyo; Masaaki Yanagi, Tokyo; Yoshihiro Saito, Hachioji, all of Japan

[73] Assignee: Canon Kabushiki Kaisha, Tokyo, Japan

[21] Appl. No.: 623,335

[22] Filed: Jun. 22, 1984

[30] Foreign Application Priority Data

| | | | |
|---|---|---|---|
| Jun. 28, 1983 | [JP] | Japan | 58-115177 |
| Jun. 28, 1983 | [JP] | Japan | 58-115178 |
| Dec. 28, 1983 | [JP] | Japan | 58-245337 |
| Dec. 28, 1983 | [JP] | Japan | 58-245338 |
| Dec. 28, 1983 | [JP] | Japan | 58-245339 |

[51] Int. Cl.[4] ...................... G03G 15/00; G03B 27/72
[52] U.S. Cl. .................................... 355/14 E; 355/68; 355/69
[58] Field of Search .................................... 355/67–69, 355/14 C, 14 E, 5; 307/264, 311, 351, 59; 330/280, 279, 281; 356/233

[56] References Cited

U.S. PATENT DOCUMENTS

| | | | |
|---|---|---|---|
| 3,818,198 | 6/1974 | Walker et al. | 355/233 X |
| 4,153,364 | 5/1979 | Suzuki et al. | 355/68 X |
| 4,195,235 | 3/1980 | Schoeff | 307/264 X |
| 4,341,463 | 7/1982 | Kashiwagi et al. | 355/5 X |
| 4,352,553 | 10/1982 | Hirahara | 355/68 X |
| 4,399,416 | 8/1983 | Gillespie | 330/280 X |

*Primary Examiner*—L. T. Hix
*Assistant Examiner*—D. Rutledge
*Attorney, Agent, or Firm*—Fitzpatrick, Cella, Harper & Scinto

[57] ABSTRACT

There is disclosed an image forming apparatus capable of image formation under optimum image forming conditions in response to the detected image density. The image forming apparatus has image forming unit for forming an image corresponding to an original on a recording material, detector for detecting the image density of the original, and controller for controlling the operable condition of said image forming unit to regulate the copy density in response to the image density detected by said detector said controller includes memory storing control data for the operable condition of said image forming unit in response to the detected image density, and is adapted to make an access to said memory in response to the detection signal of said detector and to control said operable condition according to control data obtained by said access.

21 Claims, 10 Drawing Figures

IMAGE FORMING APPARATUS

BACKGROUND OF THE INVENTION

1. Field of the Invention

The present invention relates to an image forming apparatus capable of image formation under optimum image forming conditions in response to the detected image density.

2. Description of the Prior Art

There is already known an apparatus in which an original is illuminated with the light of a determined intensity and is scanned with a photosensor to detect, by the output signals thereof, the light intensities from the background area and image area of said original, whereby the image forming condition such as the exposure or developing bias is appropriately determined according to thus detected information.

In such apparatus, when the maximum output voltage of the photosensor is selected equal to the maximum level of the predetermined voltage range, the minimum output voltage of the photosensor for a usual original is several times smaller than said maximum level. Consequently the maximum value may become unmeasurable if the signal level is so selected to allow sufficiently precise measurement of the minimum value. On the other hand, the measurement of the minimum value may become insufficiently precise if the signal level is so selected to allow precise measurement of the maximum value. Particularly when the original consists of a negative image such as a microfilm, the precision of the automatic exposure adjusting function is often deteriorated since the exposure is generally determined by the maximum output voltage of the photosensor with reference to the minimum voltage thereof.

The appropriate exposure E for a film original is determined in the following manner in relation to the luminance B obtained by logarithmic conversion of the output S of the photosensor receiving the light transmitted by the original. An appropriate exposure En for a negative original is determined by:

$$En=\alpha_1 B_{min}+\beta_1(B_{max}-B_{min})+\gamma_1 \quad (1)$$

wherein $B_{min}$ and $B_{max}$ are respectively minimum and maximum luminances obtained by logarithmic conversion of the outputs $S_{min}$ and $S_{max}$ receiving the lights transmitted by the background and image areas of the original, and $\alpha_1$, $\beta_1$ and $\gamma_1$ are constants in which $\alpha_1<0$ and $\beta_1<0$. Similarly an appropriate exposure Ep for a positive original is determined by:

$$Ep=\alpha_2 B_{max}+\beta_2(B_{max}-B_{min})+\gamma_2 \quad (2)$$

wherein $\alpha_2$, $\beta_2$ and $\gamma_2$ are constants in which $\alpha_2>0$ and $\beta_2>0$.

However, linear calculation formulas such as (1) and (2) explained above may reduce the automatically adjustable density range in practice, since the appropriate exposure determined by these formulas may become different from the actually desirable exposure at a high or low image density depending on the characteristics of the photosensitive member, charger or developing bias. Particularly the contrast-dependent second correction term in the foregoing equations (1) and (2) may not be appropriate under certain process conditions and should be non-linearly modified according to whether the image contrast is high or low.

It is therefore considered to adopt non-linear equations for determining the appropriate exposure E by selecting suitable functions f(x) and g(y) for the first and second terms of the foregoing formulas (1) and (2). More specifically the appropriate exposure En Ep are determined by:

$$En=f(B_{min})+g(B_{max}-B_{min})+K_1 \quad (3)$$

for a negative original, wherein $K_1$ is a constant, and $$Ep=f(B_{max})+g(B_{max}-B_{min})+K_2 \quad (4)$$

for a positive original, wherein $K_2$ is a constant. In this manner it is rendered possible to achieve automatic exposure control within the practically realizable range of density and contract in the process.

The above-mentioned formulas (3) and (4) can perform correct exposure control if the light is measured over the entire image area of the original, but the image line is not necessarily positioned in the measureing area if it is locally limited. The probability of presence of image lines within the light measuring area is quite low in certain originals such as patent drawings, so that the calculated exposure fluctuates depending on whether the image lines exist in the light measuring area since the second term of the formula (3) or (4) is a function of the contrast or difference in luminance between the background and image areas of the original. Thus the exact copy density control is not possible as the exposure varies depending on whether the image lines are present in the light measuring area at the detection of the image density. Such situation occurs also at the control of the copy density with other adjusting means.

SUMMARY OF THE INVENTION

In consideration of the foregoing, an object of the present invention is to provide an image forming apparatus capable of appropriate image formation.

Another object of the present invention is to provide an image forming apparatus capable of image density detection with a high precision.

Still another object of the present invention is to provide an image forming apparatus capable of varying the gain of amplifying means according to the maximum and minimum values of the image density.

Still another object of the present invention is to provide an image forming apparatus capable of adjusting the reproduced image density at a high speed.

Still another object of the present invention is to provide an image forming apparatus capable of adjusting the reproduced density by access to memory means storing reproduced density data in response to detected image density.

The foregoing and still other objects of the present invention will become fully apparent from the following description.

BRIEF DESCRIPTION OF THE DRAWINGS

FIGS. 4-1 and 4-2 are flow chart showing the procedure of exposure control;

DETAILED DESCRIPTION OF THE PREFERRED EMBODIMENTS

Now the present invention will be clarified in detail by an embodiment shown in the attached drawings.

Figure 1:
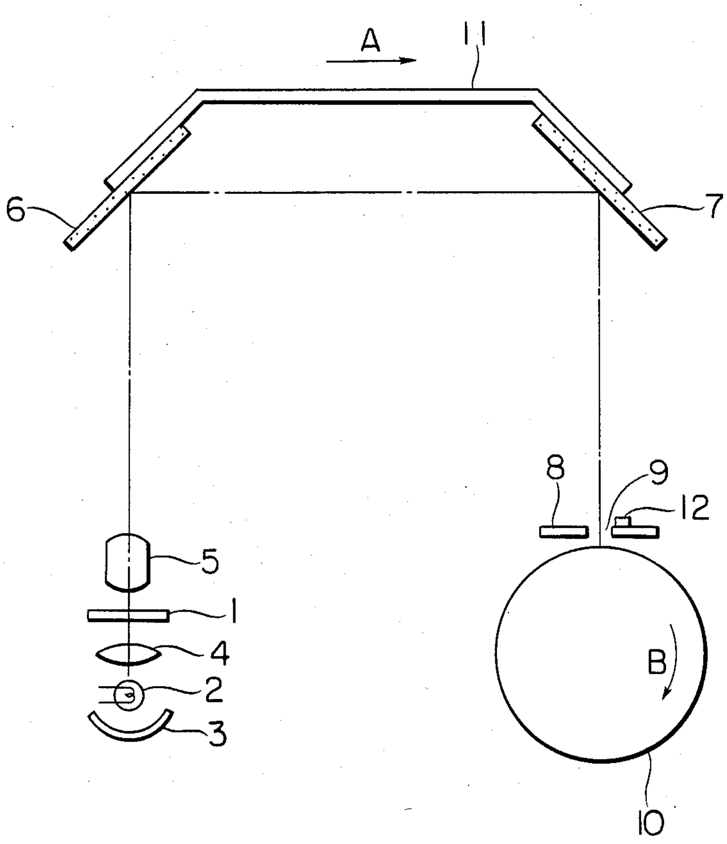
FIG. 1 is a schematic view of an electrophotographic copier embodying the present invention.

FIG. 1 schematically shows an electrophotographic copier embodying the present invention, wherein a microfilm original 1 is illuminated by an illuminating unit composed of an illuminating lamp 2, a spherical mirror 3 and a condenser lens 4, and the light from the original 1 is guided through a projecting lens 5, flat mirrors 6, 7 and a slit 9 of a slit plate 8 and projected onto a photosensitive drum 10. The mirrors 6, 7 are fixed in a mutually perpendicular positions on a support member 11, which integrally moves in a direction A together with the mirrors 6, 7. The mirrors 6, 7 are normally placed in a home position, move in the forward direction in the copying cycle to expose the photosensitive drum 10 to the image of the original 1, and return in the backward motion to the home position after said exposure step. The photosensitive drum 10 is rotated at a constant speed in a direction A indicated by arrow, and the mirrors 6, 7 are moved in synchronization with the rotation of the photosensitive drum 10 at a speed equal to ½ of the peripheral speed thereof. Immediately in front of the photosensitive drum 10 there is provided with a slit plate 8 having the aforementioned slit 9.

As explained in the foregoing, the image of the original 1 is split in a slit and focused on the periphery of the photosensitive drum 10 through the slit 9, whereby the periphery of the photosensitive drum 10 is exposed to the entire image of the original 1 by the scanning indicated by arrows A and B. A photosensor 12 is positioned in the vicinity of the slit 9 of the slit plate 8 to receive a part of the projected image reflected by the mirrors 6, 7. The photosensor 12 is used for detecting the image density of the original 1 by sensing the light transmitted by the original 1, thus determining the exposure prior to the image exposure to the photosensitive drum 10. Said detection of the image density with the photosensor 12 is conducted in a preliminary scanning of the original 1 by the mirrors 6, 7 prior to the normal exposure step, and the intensity of the lamp 2 is controlled in response to the light intensity received by the photosensor 12 during said preliminary scanning, thus appropriately regulating the exposure to the photosensitive drum 10 and providing a satisfactory copy of the original.

Figure 2:
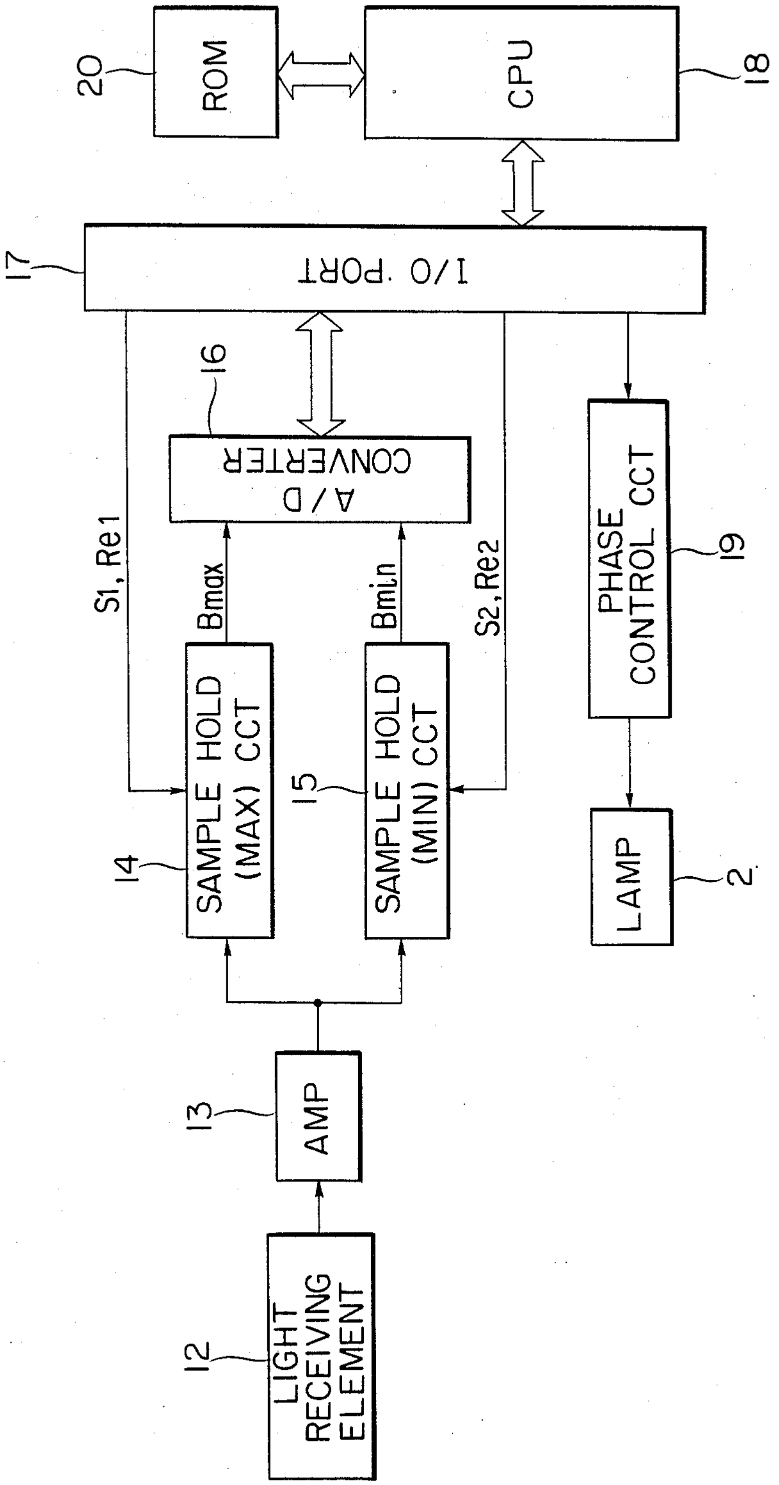
FIG. 2 is a block diagram of a control circuit therefor.

FIG. 2 is a block diagram of a control circuit for use in the electrophotographic copier shown in FIG. 1, for the purpose of controlling the copy density through exposure control by digital signal processing with a microcomputer. Image density signals obtained by photoelectric conversion in the photosensor 12 are supplied, after amplification in an output amplifying circuit 13, to a maximum sample hold circuit 14 and a minimum sample hold circuit 15. Said sample hold circuits 14, 15 respectively detect the maximum and minimum values of the image density of the original 1, and the maximum luminance information ($B_{max}$) and the minimum luminance information ($B_{min}$) thus obtained are converted into digital signals in an A/D converter 16 incorporating a multiplexer and are supplied to a central processing unit (CPU) 18 through an I/O port 17.

The sample holding of the maximum and minimum values of said image density signals is conducted at a determined process timing, and the sample signals $S_1$, $S_2$ and reset signals $Re_1$, $Re_2$ are supplied from the CPU 18 to the sample hold circuits 14, 15 through the I/O port 17. The CPU 18 performs data processing as will be explained later in response to the maximum luminance information $B_{max}$ and the minimum luminance information $B_{min}$, and supplies pulses corresponding to the result of said processing to a phase control circuit 19. A bidirectional transistor (triac) in said phase control circuit 19 is turned on and off repeatedly in response to said pulses, thus performing phase control of the power supply to the illuminating lamp 2. The exposure is controlled in this manner to appropriately regulate the copy density.

Now there will be given an explanation on the aforementioned process in the CPU 18, taking an example of copying from a negative original image.

The appropriate exposure E is determined from the maximum luminance information $B_{max}$ and the minimum luminance information $B_{min}$ supplied to the CPU 18, based on a functional formula involving functions f(x) and g(y) to be explained in the following:

$$E=f(B_{min})+g(B_{max}-B_{min})+K_3 \quad (5)$$

The functions f(x), g(y) of the maximum and minimum values are stored as a table in a read-only memory (ROM) 20 shown in FIG. 2, wherein f(x) is a function for calculating the reference exposure or the amount of correction in response to the luminance of the background of the original, while g(y) is a function for calculating the amount of correction in response to the difference in luminance between the background area and the image line area of the original, namely the density contrast. The constant $K_3$ may also be incorporated in the function f(x) or g(y) to obtain $K_3=0$, so that the equation (5) is represented solely by the functions f(x) and g(y).

As an example, let us assume that $K_3=0$ and that the function f(x) is defined in such a manner that the correction function becomes $g(y)=0$ at a standard contrast ($y=3-4$) and at a very low contrast ($y=0$), and the values of the functions f(x) and g(y) are stored as a table as shown in Tabs. 1 and 2.

TABLE 1

| x | f(x) |
|---|---|
| 5 | 1 |
| 4 | 2 |
| 3 | 3 |
| 2 | 5 |
| 1 | 7 |
| 0 | 10 |

TABLE 2

| y | g(y) |
|---|---|
| 5 | −1 |
| 4 | 0 |
| 3 | 0 |
| 2 | +1 |
| 1 | +1 |
| 0 | 0 |

In such case the appropriate exposure E is determined as follows:

Example 1: for $B_{max}=4$, $B_{min}=1$:

$E=f(1)+g(4-1)=7+0=7$

Example 2: for $B_{max}=3$, $B_{min}=2$:

$E=f(2)+g(3-2)=5+1=6$

Example 3: for $B_{max}=2$, $B_{min}=2$ (case of no contrast)

$E=f(2)+g(2-2)=5+0=5$

In the above-mentioned function g(y), a value g(y)=0 is determined by referring to the table in case of y<1, but such table reference can be dispensed with by defining the function g(y)=0 in case of $y<y_s$ in which $y_s$ is a reference value. The reference value $y_s$ may be determined in an arbitrary manner.

The value of the exposure E thus calculated is converted into the number of count from the zero-crossing point of the AC terminal voltage supplied to the illuminating lamp, based on a table shown in Tab. 3:

TABLE 3

| E | 12 | 11 | 10 | 9 | 8 | 7 | 6 | 5 | 4 | 3 | 2 | 1 | 0 |
|---|---|---|---|---|---|---|---|---|---|---|---|---|---|
| n(50) | 8 | 28 | 39 | 46 | 51 | 55 | 58 | 61 | 64 | 66 | 68 | 68 | 68 |
| n(60) | 8 | 22 | 32 | 37 | 42 | 45 | 48 | 51 | 53 | 54 | 56 | 56 | 56 |

Tab. 3 shows the relationship between the number of count from the aforementioned zero-crossing point in case the illuminating lamp 2 is driven by a commercial AC power supply of 50 Hz or 60 Hz and the exposure obtained by phase control utilizing the triac, and is stored as a table in advance. In Tab. 3 n(50) and n(60) respectively represent the counts at 50 Hz and 60 Hz, and the exposure is limited at a value at E=2. In case the timer performs the counting operation at an interval of 1 μsec., the set time T of the timer for a power supply frequency of 50 Hz is given by:

$$T=100\times n(50)\ (\mu sec)$$

Consequently the time T for the aforementioned example 1, in case of 50 Hz, is given by:

$$T=100\times 55=5500\ \mu sec$$

while that for the aforementioned example 2, in case of 50 Hz, is given by:

$$T=100\times 58=5800\ \mu sec.$$

Figure 3:
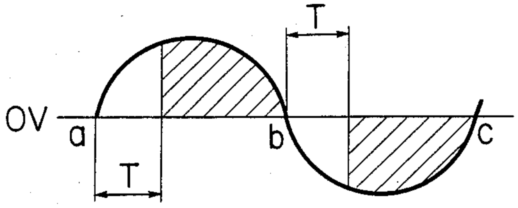
FIG. 3 is a wave form chart showing the voltage supplied to an illuminating lamp shown in FIGS. 1 and 2.

FIG. 3 shows the terminal voltage wave form of a cycle of the aforementioned illuminating lamp 2. The triac in the phase control circuit 19 is turned off for the set time T of the timer from the zero crossing point a, b or c but is turned on upon expiration of said time T and remains turned on until the next zero-crossing point, thus supplying a current to the illuminating lamp 2 as indicated by the hatched area.

Figures 1, 4:
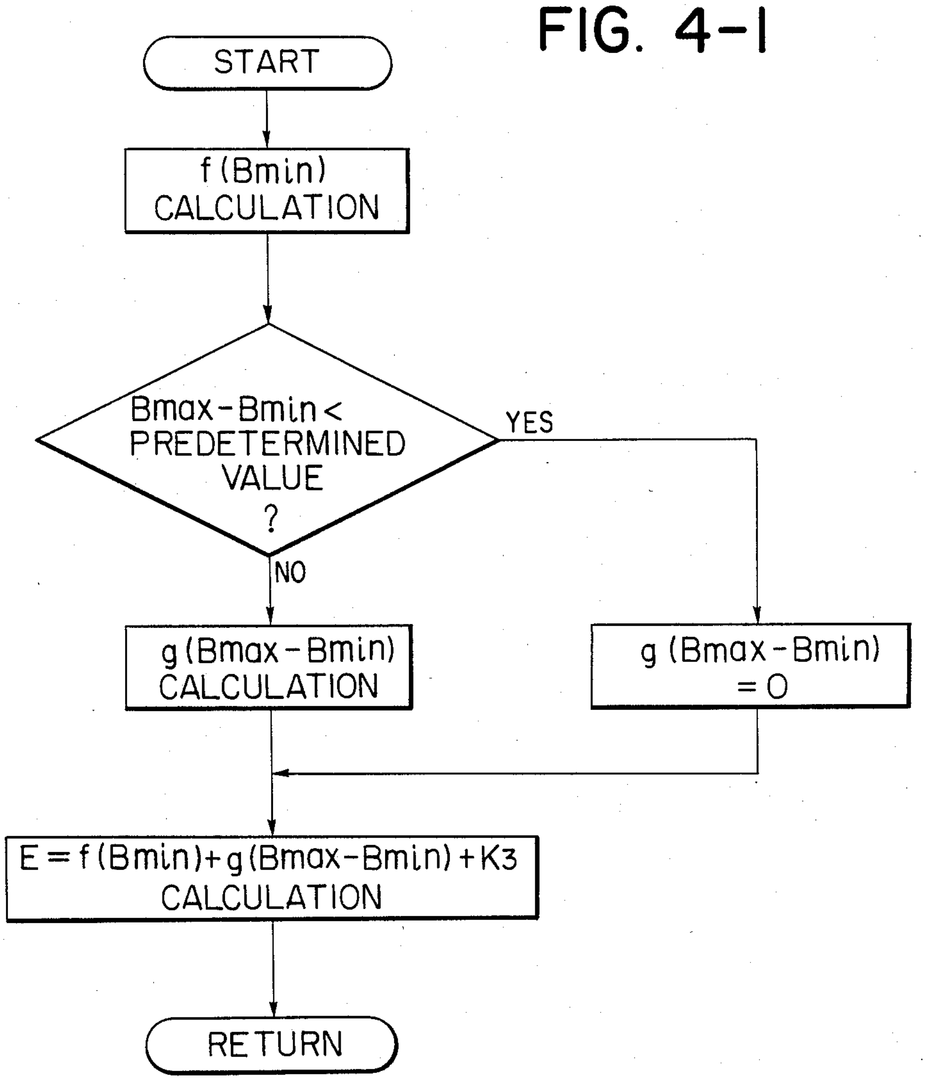
Figures 2, 4:
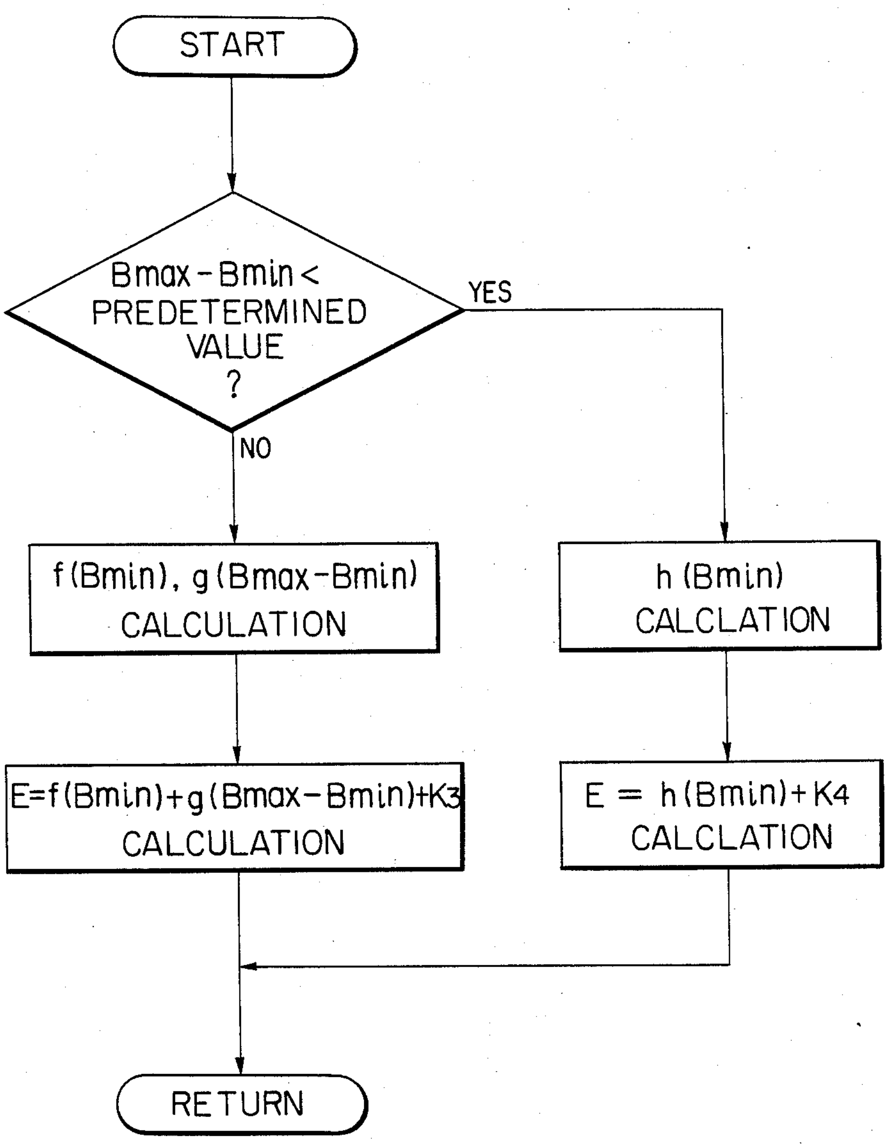

As explained in the foregoing, the copy density can be exactly controlled by the regulation of the exposure by the illuminating lamp 2 in response to the contrast of the image density of the original. In said control, the phase control circuit 19, performing as the regulating means for the copy density, is controlled according to the result of data processing in the CPU 18, conducted by the table of first and second functions f(x), g(y) stored in advance in the ROM 20. FIG. 4-1 shows a flow chart of the procedure for calculating the appropriate exposure.

In the foregoing there has been explained the operation for a negative original, but a similar control is conducted also for a positive original. In such case the first term in the formula (5) is replaced by a function $f(B_{max})$, and third and fourth function tables utilized in the data processing in the CPU 18 are stored in the ROM 20 for achieving exact exposure control.

In the foregoing embodiment the function g(y) is so determined that g(y) becomes equal to zero for a standard contrast, but it is also possible to define this function as g(y)=P, wherein P is an arbitrary constant. In such case g(y)=P is reached for an extremely low contrast. On the other hand, if g(y) is so selected to attain g(y)=0 at the standard contrast, there may be employed an equation $E=f(x)+K_4$ for an extremely low contrast, wherein $K_4$ is a constant.

More specifically the appropriate exposure E is calculated from the maximum luminance information $B_{max}$ and the minimum luminance information $B_{min}$ supplied to the CPU 18 in such case utilizing functions f(x), g(y) and h(z) as will be explained in the following.

Thus, the appropriate exposure E is calculated, when the difference between the maximum and minimum values of the image density of the original exceeds a determined value ($B_{max}-B_{min}\geqq$determined value), by:

$$E=f(B_{min})+g(B_{max}-B_{min})+K_3 \quad (5)$$

wherein $K_3$ is a constant, whereas it is calculated, when said difference is less than a determined value ($B_{max}-B_{min}<$determined value), by:

$$E=h(B_{min})+K_4 \quad (6)$$

wherein $K_4$ is a constant. The functions f(x), g(y) and h(z) of the variables x, y, z responding to the maximum and minimum values are stored, as tables, in the read-only memory 20 shown in FIG. 2, wherein f(x) and h(z) are utilized for calculating the standard exposure or the amount of correction in response to the luminance of the background area of the original, while g(y) is used for calculating the correction in response to the contrast or the difference of the luminances in the background area and image line area of the original. The constants $K_3$, $K_4$ may be incorporated in f(x), h(z) or g(y) to write the equations (5), (6) solely with the function f(x), g(y) and/or h(z).

As an example, let us now assume that $K_3m\ K_4=0$ and that the function f(x) is defined in such a manner that the correction function becomes g(y)=0 at a standard contrast (y=3–4) while the function h(z) is so defined that the exposure is solely determined by h(z) in case of y<2, i.e. if the contrast is less than a determined value "2", and the values of the functions f(x), g(y) and h(z) are stored as tables as shown in Tabs. 4, 5 and 6:

TABLE 4

| x | f(x) |
|---|---|
| 5 | 1 |
| 4 | 2 |
| 3 | 3 |
| 2 | 5 |
| 1 | 7 |
| 0 | 10 |

TABLE 5

| z | h(z) |
|---|---|
| 5 | 2 |

TABLE 5-continued

| z | h(z) |
|---|---|
| 4 | 3 |
| 3 | 4 |
| 2 | 6 |
| 1 | 7 |
| 0 | 9 |

TABLE 6

| y | g(y) |
|---|---|
| 5 | −1 |
| 4 | 0 |
| 3 | 0 |
| 2 | +1 |

In this case the appropriate exposure E is calculated as follows:

Example 1: for $B_{max}=4$ and $B_{min}=1$:
$E=f(1)+g(4-1)=7+0=7$

Example 2: for $B_{max}=3$ and $B_{min}=2$:
$E=h(2)=6$.

The appropriate exposure E thus calculated is converted, by the aforementioned table shown in Table 3, into the number of count from the zero-crossing point in the terminal AC voltage supplied to the illuminating lamp 2. The data processing in the CPU 18 is also conducted with the function tables f(x), g(y) and h(z) stored in advance in the ROM 20 used as a memory for storing the amounts of adjustment of the copy density in response to the detected density. FIG. 4-2 shows a flow chart of the procedure for calculating the appropriate exposure.

In the foregoing there has been explained the operation for a negative original, but a similar control is conducted also for a positive original. In such case the first term in the formula (5) or (6) is replaced by a function $f(B_{max})$ or $h(B_{max})$, and fourth, fifth and sixth function tables utilized in the data processing in the CPU 18 are stored in the ROM 20 for achieving exact exposure control.

In the foregoing embodiment the copy quality or the copy density is automatically controlled by the exposure, but such control can also be achieved by the developing bias or the process speed, and in such case the formula (5) or (6) can be used without change if the function f(x), g(y) or h(z), or the values of the tables stored in the ROM 20, are suitable changed.

Besides the exposure control can be achieved, in addition to the phase control of the illuminating lamp explained above, also by the control of the terminal voltage of or the current in the lamp, and moreover control with a diaphragm or a filter is likewise possible.

As explained in the foregoing, the use of memory means for storing in advance the amounts of adjustment of the copy density in response to the maximum and minimum values of the detected image density and the adjustment of copy density by making access to said memory means in response to the detected values enable easy and accurate adjustment of the copy density even when the density of image line in the original image cannot be detected in copying a film original, thus practically expanding the range of density adjustment and allowing high-speed control based on the already stored amounts of adjustment.

In case of controlling the image forming conditions such as exposure in response to the maximum and minimum values of the image density, it is naturally essential to detect said maximum and minimum values with a high precision.

Figure 5:
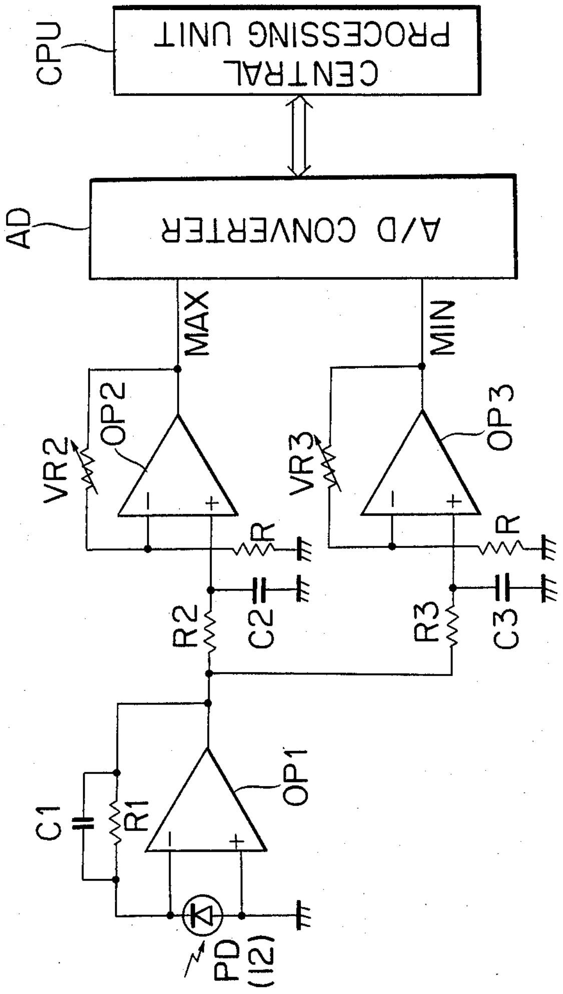
FIGS. 5-7 are circuit diagrams showing circuits for detecting the maximum and minimum image densities with two amplifiers.

FIG. 5 shows a control circuit capable of measuring both the maximum and minimum values of the output voltage from the photosensor by suitably varying the gains of two amplifiers in the measurements of said maximum and minimum values.

The light transmitted or reflected by an original is scanned by a photosensor PD (corresponding to the photosensor 12 in FIG. 1) to convert said light into a current I, which is in turn converted into a voltage by a feedback circuit composed of an operational amplifier OP1 and a resistor R1. A condenser C1 is connected parallel to the resistor R1 to intercept the unnecessary high frequency components and to prevent oscillation.

The voltage obtained by conversion in the operational amplifier OP1 is supplied to operational amplifiers OP2 and OP3. A resistor R2 and a condenser C2, and a resistor R3 and a condenser C3 respectively connected to the input terminals of said operational amplifiers OP2, OP3 constitute integrating filters. Also a variable feedback resistor VR2 and a resistor R, and a variable feedback resistor VR3 and a resistor R are respectively connected to the inverted input ports of said operational amplifiers OP2, OP3. In the above-explained structure, the operational amplifier OP2 amplifies the output voltage of the operational amplifier OP1 with a gain of 1+VR2/R. On the other hand the operational amplifier OP3 amplifies the output voltage of the operational amplifier OP1 with a gain of 1+VR3/R.

The output signals of the operational amplifiers OP2, OP3 are supplied, respectively as a maximum level output signal and a minimum level output signal, to an analog-to-digital converter AD, of which digital output signals are in turn supplied to a central processing unit CPU for ordinary image processing whose details will be omitted.

In case a negative image is used for measurement, the variable resistor VR3 is adjusted in such a manner that the output of the operational amplifier OP3 comes close to the reference voltage for the analog-to-digital coverter AD for a negative image with a lowest background density in the normally acceptable range, and the variable resistor VR2 is adjusted in such a manner that the output of the operational amplifier OP2 comes close to the reference voltage of the analog-to-digital converter AD for a negative image with a lowest image line density in the normally acceptable range regardless of the contrast thereof.

Such adjustments allow to achieve light measurement with a high precision, fully utilizing the resolving power of the analog-to-digital converter AD for both of the image line area and the background area of the negative original.

On the other hand, in case a positive image is measured, the variable resistor VR2 is adjusted in such a manner that the output of the operational amplifier OP2 comes close to the reference voltage of the analog-to-digital converter AD for an original with a lowest background density in the normally acceptable range, and the variable resistor VR3 is adjusted in such a manner that the output of the operational amplifier OP3 comes close to the reference voltage of the analog-to-digital amplifier OP3 for an original with a lowest image line density in the normally acceptable range regardless of the contrast thereof.

The analog-to-digital converter AD is provided therein with a multiplexer which alternately introduces the output voltage MAX from the operational amplifier OP2 and the output voltage MIN from the operational amplifier OP3 to the analog-to-digital converter AD in the course of the light measurement in response to signals from the central processing unit CPU. The duty ratio of the output signals MAX/MIN need not be equal to 50%, and the central processing unit CPU can easily modify, by appropriate softwares, the duty ratio for example to emphasize the image line area which is generally more difficult to pick up (i.e. to increase the proportion of the output voltage MAX in case of a negative image), or to vary said ratio according to the scanning position.

As explained in the foregoing, the voltages MAX, MIN introduced into the analog-to-digital converter AD are supplied to the central processing unit CPU after conversion into digital signals. In this step the output voltages MAX and MIN are respectively compared in succession with the maximum and minimum values, so that the data finally remaining at the end of the light measurement represent the data of the image line area and the background area on the negative image. Such data representing the image line area and the background area are used in the known process to regulate the exposure, developing bias etc., thus controlling the image forming conditions to obtain an appropriate image.

Figure 6:
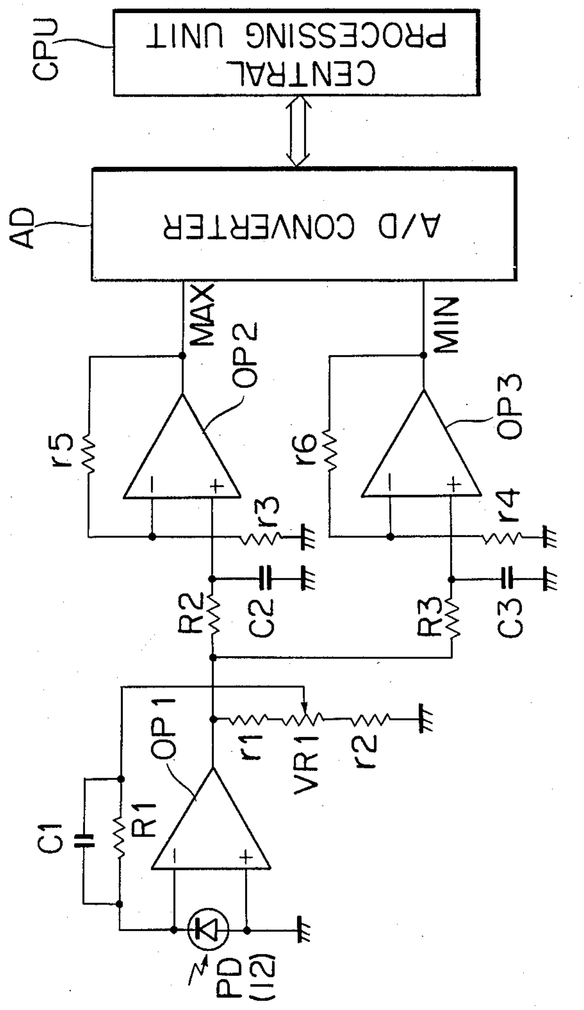

If the difference of the gains of the operational amplifiers OP2 and OP3 is already known in the circuit shown in FIG. 5, it is possible, as shown in FIG. 6, to regulate the feedback of the operational amplifier OP1 with a variable resistor VR1 and resistors r1, r2, to replace the resistors R with resistors r3, r4 and to replace the variable resistors VR2, VR3 with fixed resistors r5, r6. In such case the variable resistor VR1 is provided for regulating the gain of the entire circuit in order to compensate the eventual fluctuations in the components such as the photosensor PD.

Figure 7:
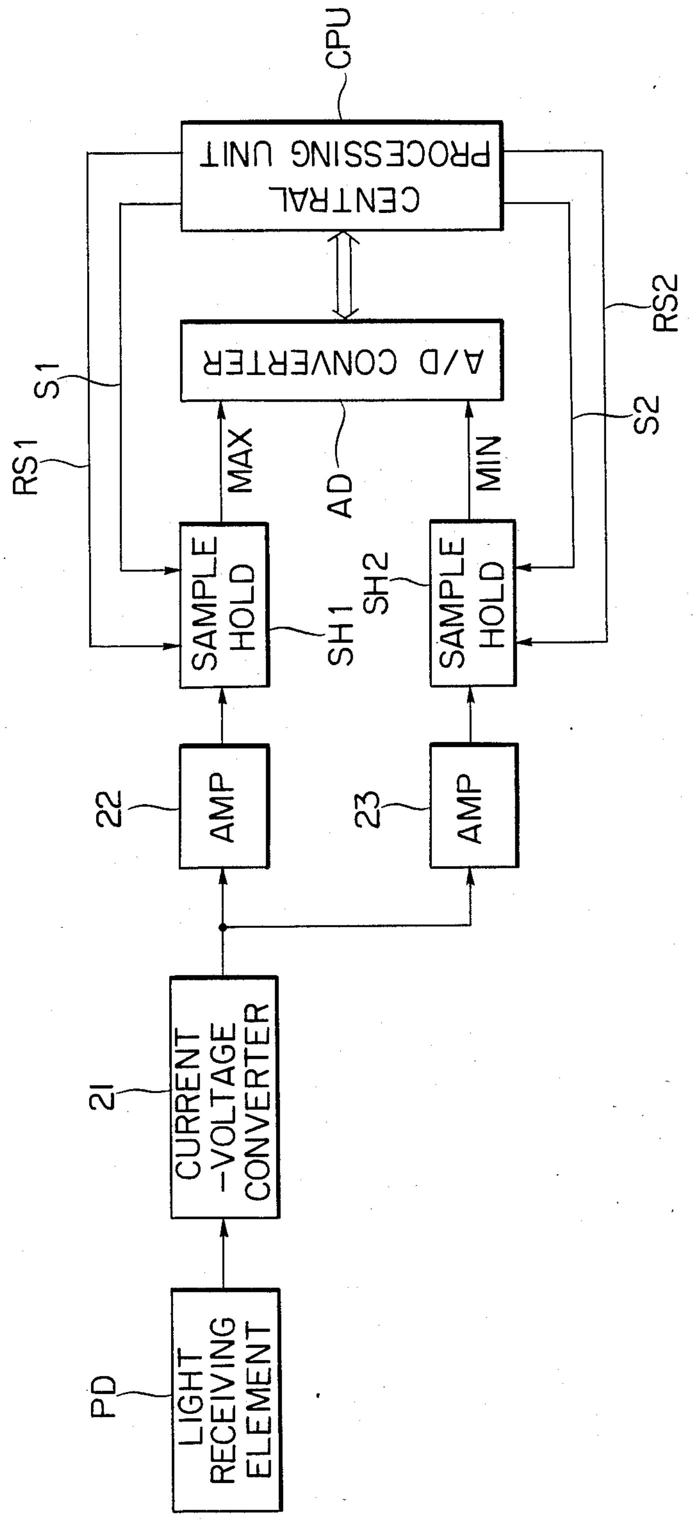

In the foregoing two embodiments the output voltages MAX and MIN are introduced into the central processing unit CPU on time-sharing basis by means of the multiplexer, but such structures may deteriorate the accuracy of the data because of the limited number of samples in case the converting speed of the analog-to-digital converter AD is low. In such case there may employed sample-hold circuits as shown in FIG. 7. In such case, as already explained before, the light received by the photosensor PD is converted into a voltage by means of a current-voltage converting circuit 21 incorporating an operational amplifier OP1 and supplied then to amplifying circuits 22, 23 of respective gains N, M and incorporating operational amplifiers OP2, OP3. In the present embodiment, the N- and M-times amplified voltages are respectively supplied to sample hold circuits SH1, SH2.

The gains N and M are determined by the density range of the original image in the same manner as explained before.

As already known, the sample hold circuits SH1, SH2 receive reset signals RS1, RS2 and sampling signals S1, S2 from the output ports of the central processing unit CPU.

The sample hold circuit SH1 holds the maximum peak while the sample hold circuit SH2 holds the minimum peak.

The voltages thus held are supplied, as explained in the foregoing, to the analog-to-digital converter AD incorporating a multiplexer in alternate switching. Said switching may be conducted once for each sampling.

It is also possible to repeat the sampling operation several times for each position, and to average the maximum values and minimum values for each position.

In such case it is furthermore possible to make a correction for the shading phenomenon of the lens by taking a weighted average of the sampled data for each position, thus further improving the accuracy.

Figure 8:
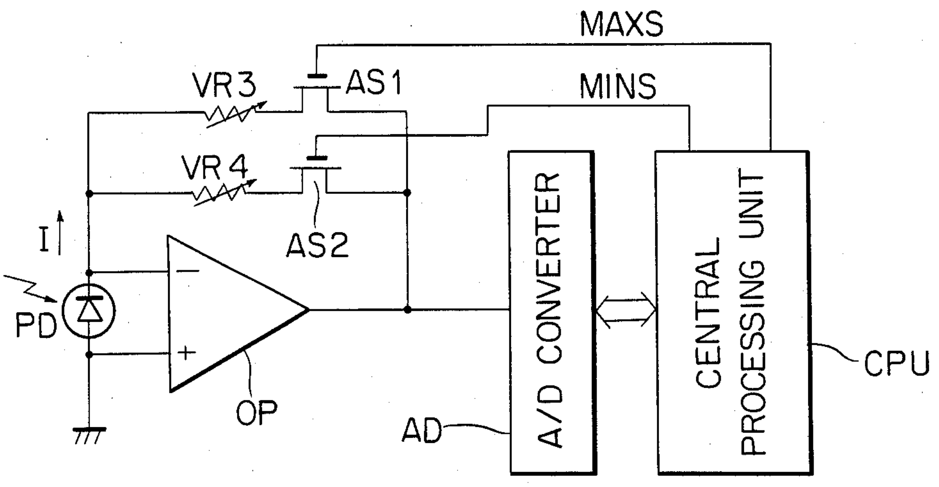
FIGS. 8 and 9 are circuit diagrams showing circuits for detecting the maximum and minimum image densities with an amplifier.
Figure 9:
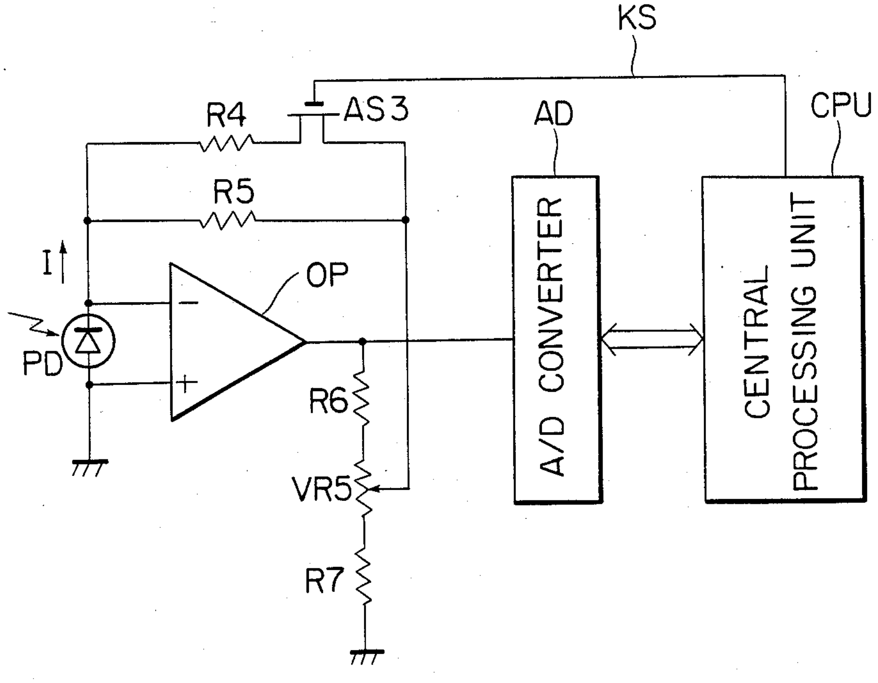

Furthermore the accuracy of measurement can be improved both for the maximum and minimum values by employing an amplifier and selecting the gain thereof suitably for the maximum measurement and for the minimum measurement. FIG. 8 shows a circuit structure for such embodiment. The light transmitted or reflected by an original is scanned with a photosensor PD to convert said light into a current I, which is in turn converted into a voltage by a feedback circuit composed of an operational amplifier together with an analog switch AS1 and a variable resistor VR1 or with an analog switch AS2 and a variable resistor VR2.

The analog switches AS1, AS2 can be composed of field-effect transistors with insulated gates, and signals MAXS and MINS from the central processing unit CPU render either one of the analog switches AS1, AS2 conductive. For example, when the analog switch AS1 is turned on while the analog switch AS2 is turned off, the amplifier OP provides an output voltage $-I\times VR1$ in which I represents the photocurrent of the photosensor PD and the resistance in the analog switch AS1 is neglected.

On the other hand, in case the analog switch AS1 is turned off while the analog switch AS2 is turned on, the amplifier OP provides an output voltage $-I\times VR2$.

The central processing unit CPU receives the signals in succession from the analog-to-digital converter AD, and selects the reference for comparison for the maximum or minimum value in synchronization with the switching of the analog switches AS1, AS2.

Thus, in case a negative image is measured, the variable resistor VR4 is regulated in such a manner that the output of the operational amplifier OP comes close to the reference voltage of the analog-to-digital converter AD for a negative image with a lowest background density within the practically acceptable range, and the variable resistor VR3 is regulated in such a manner that the output of the operational amplifier OP comes close to the reference voltage of the analog-to-digital converter AD for a negative image with a lowest image line density within the normally acceptable range, regardless of the contrast. In this manner light measurement can be achieved with a high accuracy, fully exploiting the resolving power of the analog-to-digital converter AD for both the image line area and the background area of the negative image.

On the other hand, in case a positive image is measured, the variable resistor VR3 is regulated in such a manner that the output of the operational amplifier OP comes close to the reference voltage of the analog-to-digital converter AD for an original image with a lowest background density within the normally acceptable range, and the variable resistor VR4 is regulated in such a manner that the output of the operational amplifier OP comes close to the reference voltage of the analog-to-digital converter AD for an original image of a lowest image line density within the normally accepted range, regardless of the contrast.

Switching signals MAXS and MINS from the central processing unit CPU activate the analog switches AS1, AS2 alternately to regulate the gain of the operational amplifier OP for the maximum signal MAX and the minimum signal MIN in alternate manner, whereby the operational amplifier OP supplies the analog-to-digital converter AD with output signals representing the maximum and minimum values of the output voltage of the photosensor PD in time-sharing basis. The duty ratio of said switching signals MAXS and MINS need not be equal to 50%, and the central processing unit CPU can easily modify, by appropriate softwares, the duty ratio for example to emphasize the image line area which is generally more difficult to pick up (i.e. to increase the proportion of the output voltage MAX in case of a negative image), or to vary said ratio according to the scanning position.

As explained in the foregoing, the voltage supplied to the analog-to-digital converter AD is supplied to the central processing unit CPU after conversion into a digital signal. In the course of the light measurement said signal is compared, in the operational amplifier OP, with the maximum value or with the minimum value respectively when said amplifier OP has a gain corresponding to the maximum or minimum value, and data finally remaining at the end of the light measurement step represent measured data corresponding to the image line area and the background area of the negative image. Such data representing the image line area and the background area are used in the known process to regulate the exposure, developing bias etc. thus obtaining an appropriate image.

If the difference of the gains for the maximum and minimum values in the operational amplifier OP is already known, it is possible, as shown in FIG. 6, to replace the variable resistors VR3, VR4 with fixed resistors R4, R5, to variably regulate the amount of feedback from the operational amplifier OP whereby the eventual fluctuation for example in the photosensor PD can be compensated by the variable resistor VR5. In such case an analog switch AS3 is serially connected to the resistor R4 but the resistor R5 is not provided with any analog switch. Thus, for the signal MIN, the analog switch AS3 is turned off to obtain an output voltage $-I \times R5$ from the operational amplifier OP in response to the photocurrent I of the photosensor PD, and, for the signal MAX, the analog switch AS3 is turned on to obtain an output voltage $-I \times R4/R5$ from the operational amplifier OP. The present embodiment is characterized by a simpler structure and easier adjustment, since there is employed only one variable resistor VR5 and the central processing unit CPU is required to generate only one switching signal KS to the analog switch AS3.

As explained in the foregoing, the gain of the amplifier is adjusted to the levels suitable for the measurements of the maximum and minimum signals of the photosensor. Thus, for a negative original such as a photographic film, the background density provides the reference minimum output of the photosensor, but it is rendered possible to avoid a situation where the use of a high measuring level deteriorates the accuracy of minimum measurement or the use of a low measuring level hinders the measurement of the maximum output. In this manner the maximum and minimum values can both be measured with a satisfactory accuracy.

In the foregoing embodiment the image density of the original is detected by measuring the light from the original, but it is also possible to detect the image density by forming an electrostatic latent image or a developed image corresponding to the original on a photosensitive member and measuring the surface potential or the developed image density.

What we claimed is:

1. An image forming apparatus comprising:
image forming means for forming an image corresponding to an original on a recording material;
detecting means for continuously detecting the image density of the original, said detecting means detecting the maximum and minimum values of the image density; and
control means for controlling an operable condition of said image forming means to regulate the copy density in response to the maximum and minimum values of the image density detected by said detecting means;
wherein said control means comprises memory means for storing a plurality of control data corresponding to the maximum and minimum values of the image density, and wherein said control means obtains access data in response to the maximum and minimum values from said detecting means, accesses said memory means in response to the access data, and controls said operable condition in response to said control data obtained by said access data.

2. An image forming apparatus according to claim 1, wherein said control means provides an operation mode for accessing said memory means in accordance with the difference between the maximum and minimum values of said image density.

3. An image forming apparatus according to claim 2, wherein said memory means comprises a first memory unit storing control data corresponding to said maximum or minimum value, and a second memory unit storing control data corresponding to the difference of said maximum and minimum values.

4. An image forming apparatus according to claim 2, wherein said image forming means comprises exposure means for original exposure, and said control means is adapted to control the amount of exposure of said exposure means in response to the output of said detecting means.

5. An image forming apparatus according to claim 4, wherein said original is a film original.

6. An image forming apparatus according to claim 5, wherein said control means is adapted, in case said film original is a negative image, to control said exposure by means of control data corresponding to the minimum value of said image density and control data corresponding to the difference between the maximum and minimum values.

7. An image forming apparatus according to claim 5, wherein said control means is adapted, in case said film original is a positive image, to control said exposure by means of control data corresponding to the maximum value of said image density and control data corresponding to the difference between the maximum and minimum values.

8. an image forming apparatus comprising:
image forming means for forming an image corresponding to an original on a recording material, wherein said image forming means comprises exposure means for original exposure;

detecting means for detecting the image density of the original, said detecting means detecting the maximum and minimum values of said image density of the original; and control means for controlling said exposure means to regulate the copy density in response to the maximum and minimum values of said image density of the original detected by said detecting means, wherein said control means comprises timer means for performing a timer operation in response to the maximum or minimum value of said image density so as to control said exposure means, wherein a setting mode of the timer operation is adjusted in response to a difference between the maximum and minimum values of said image density.

9. An image forming apparatus according to claim 8, wherein said exposure means receives the supply of an AC voltage, and said timer means is adapted to effect the timer function from a zero-crossing point of said AC voltage.

10. An image forming apparatus according to claim 9, wherein said control means is adapted to turn off power supply to said exposure means during the timer function of said timer means and to turn on power supply to said exposure means upon expiration of said timer function.

11. An image forming apparatus according to claim 9, wherein the operation time of said timer means is a time corresponding to the maximum or minimum value of said image density and to a frequency of said AC voltage.

12. An image forming apparatus comprising:

image forming means for forming an image corresponding to an original on a recording material;

detecting means for detecting the image density of the original;

amplifying means for amplifying the output of said detecting means with different gains in the course of detection of the image density by said detecting means; and control means for controlling said image forming means to regulate the copy density in response to the output of said amplifying means, wherein said amplifying means comprises two amplifying circuits of mutually different gains, which respectively release data corresponding to the measurements of maximum and minimum values of said image density.

13. An image forming apparatus according to claim 12 wherein said control means comprises input means for entering, by switching an a time-sharing basis, the output signals from said two amplifying circuits.

14. An image forming apparatus according to claim 13, wherein said input means comprises a multiplexer.

15. An image forming apparatus according to claim 13, wherein said input means sample hold means for holding samples of the output signals from said two amplifying circuits.

16. An image forming apparatus comprising:

image forming means for forming an image corresponding to an original on a recording material;

detecting means for detecting the image density of the original;

amplifying means for amplifying the output of said detecting means with different gains in the course of detection of the image density by said detecting means; and control means for controlling said image forming means to regulate the copy density in response to the output of said amplifying means, wherein said amplifying means comprises an amplifier and switching means for varying the gain thereof.

17. An image forming apparatus according to claim 16, wherein said switching means is adapted to switch said gain by selecting a feedback circuit of said amplifier.

18. An image forming apparatus according to claim 17, wherein said feedback circuit comprises plural resistors connected in parallel between the input and output of said amplifier, and switching means for selecting one of said resistors.

19. An image forming apparatus according to claim 18, wherein said control means is adapted to switch said switching means on time-sharing basis.

20. An image forming apparatus comprising:

image forming means for forming an image corresponding to an original on a recording material;

detecting means for continuously detecting the image density of the original, said detecting means detecting the maximum and minimum values of said image density of the original; and control means for controlling an operable condition of said image forming means so as to regulate the copy density in response to the maximum and minimum values of said image density detected by said detecting means, wherein said control means comprises first memory means for storing a plurality of first control data corresponding to the maximum or minimum value of said image density, and second memory means for storing a plurality of second control data for controlling said operable condition means, said first memory means being accessed in response to the maximum and minimum values from said detecting means and said second memory means being accessed in response to the accessed first control data, and wherein said control means controls said operable condition in response to the accessed second control data.

21. An image forming apparatus according to claim 20, wherein said first memory means has a plurality of memory tables, and said control means selects said memory table in response to the difference between the maximum and minimum values of said image density so as to change an access mode for said first memory means.

* * * * *